(12) United States Patent
Rohde et al.

(10) Patent No.: US 7,556,489 B2
(45) Date of Patent: Jul. 7, 2009

(54) GUIDING OF A CUT-OPEN PARISON

(75) Inventors: Wolfgang Rohde, Speyer (DE); Jörg Meyer, Dannstadt-Schauernheim (DE); Rainer Sattel, Waldsee (DE); Jörg Schnorr, Ludwigshafen (DE); Bernhard Springholz, Malsch (DE); Roger Weinlein, Frankfurt (DE); Andreas Wüst, Zwingenberg (DE)

(73) Assignee: Basell Polyolefine GmbH, Wesseling (DE)

( * ) Notice: Subject to any disclaimer, the term of this patent is extended or adjusted under 35 U.S.C. 154(b) by 104 days.

(21) Appl. No.: 10/520,537

(22) PCT Filed: Jul. 9, 2003

(86) PCT No.: PCT/EP03/07363

§ 371 (c)(1),
(2), (4) Date: Aug. 5, 2005

(87) PCT Pub. No.: WO2004/007183

PCT Pub. Date: Jan. 22, 2004

(65) Prior Publication Data

US 2006/0099290 A1    May 11, 2006

Related U.S. Application Data

(60) Provisional application No. 60/405,445, filed on Aug. 20, 2002.

(30) Foreign Application Priority Data

Jul. 12, 2002    (DE)    ................................ 102 31 867

(51) Int. Cl.
*B28B 11/14*    (2006.01)

(52) U.S. Cl. ........................ 425/297; 425/308; 425/527; 425/531; 264/152; 264/159

(58) Field of Classification Search ................ 425/527, 425/531, 289, 297, 308; 264/138, 152, 157, 264/159, 160
See application file for complete search history.

(56) References Cited

U.S. PATENT DOCUMENTS 4,022,559 A * 5/1977 Nielson ....................... 425/184

(Continued)

FOREIGN PATENT DOCUMENTS

DE    19814314    10/1999

(Continued)

OTHER PUBLICATIONS

Kagitani, translation of JP 06218792, Aug. 9, 1994.*

(Continued)

*Primary Examiner*—Maria Veronica D Ewald
(74) *Attorney, Agent, or Firm*—William R. Reid

(57) ABSTRACT

The invention relates to a device for partitioning the plastic parisons to give at least one semifinished open-surface product (6), where the device encompasses at least one means of partitioning (3) the plastic parison and one means of drive (2). The means of drive may be composed of one, but preferably of two, driven rolls. It has been found that use of the device of the invention can reduce or prevent the production of creasing and irregularity at the margins, i.e. at the cut edges, of the partitioned parisons, i.e. of the resultant semifinished sheets.

23 Claims, 3 Drawing Sheets

U.S. PATENT DOCUMENTS

| | | | |
|---|---|---|---|
| 4,028,034 A * | 6/1977 | Hahn | 425/527 |
| 4,550,008 A * | 10/1985 | Shimizu | 264/527 |
| 4,626,574 A * | 12/1986 | Cancio et al. | 525/240 |
| 4,885,895 A * | 12/1989 | Focke et al. | 53/73 |
| 5,047,196 A * | 9/1991 | Zuckerberg et al. | 264/173.14 |
| 6,183,683 B1 | 2/2001 | Schwochert | |
| 6,294,114 B1 | 9/2001 | Muirhead | |
| 6,661,339 B2 | 12/2003 | Muirhead | |
| 6,749,418 B2 | 6/2004 | Muirhead | |
| 2001/0015513 A1* | 8/2001 | Schaftingen et al. | 264/515 |
| 2002/0024171 A1 | 2/2002 | Rohde et al. | |
| 2002/0105115 A1* | 8/2002 | Sadr | 264/510 |
| 2003/0090024 A1* | 5/2003 | Skov et al. | 264/157 |
| 2006/0141184 A1 | 6/2006 | Rohde et al. | |

FOREIGN PATENT DOCUMENTS

| | | | |
|---|---|---|---|
| DE | 10010900 | | 9/2001 |
| DE | 10042121 | | 3/2002 |
| EP | 653286 | | 5/1995 |
| EP | 1110697 | | 6/2001 |
| EP | 1184157 | | 3/2002 |
| FR | 2420415 | | 10/1979 |
| GB | 1410215 | | 10/1975 |
| JP | 61261021 | | 11/1986 |
| JP | 06218792 | * | 8/1994 |
| JP | 2000218684 | | 8/2000 |
| WO | 2004/007182 | | 1/2004 |

OTHER PUBLICATIONS

Patent Abstracts of Japan, vol. 011, No. 120 (M-580) (Apr. 15, 1987).
Patent Abstracts of Japan, vol. 2000, No. 11 (Jan. 3, 2001).
Patent Abstracts of Japan, vol. 018, No. 585 (M-1700) (Nov. 9, 1994).

* cited by examiner

GUIDING OF A CUT-OPEN PARISON

This application is the U.S. national phase of International Application PCT/EP2003/007363, filed Jul. 9, 2003, claiming priority to German Patent Application 10231867.0 filed Jul. 12, 2002, and the benefit under 35 U.S.C. 119(e) of U.S. Provisional Application No. 60/405,445, filed Aug. 20, 2002; the disclosures of International Application PCT/EP2003/007363, German Patent Application 10231867.0 and U.S. Provisional Application No. 60/405,445, each as filed, are incorporated herein by reference.

The present invention relates to a device for partitioning a plastic parison to give one or more molten semifinished sheets.

DE 100 42 121 discloses a process for producing hollow plastic articles and encompassing the following steps:
a) production of a tubular plastic parison on a blow molding or coextrusion blow molding plant
b) cutting the extruded or coextruded plastic parison open to give at least one semifinished open-surface product
c) thermoforming of the resultant semifinished open-surface products to give half shells
d) welding of the thermoformed half shells to give a hollow article The principle of this process for producing hollow plastic articles is that a plastic parison produced on a blow molding or coextrusion blow molding plant is cut open in an axial direction and the resultant molten semifinished sheets are placed in two thermoforming molds and formed to give the desired shape. This gives two half shells which can then be welded together at suitable temperatures, for example the temperature used for thermoforming. Production of the semifinished open-surface products on a blow molding plant provides reproducible wall thickness control and thus high design freedom.

If a coextrusion blow molding plant is used, layers made from barrier polymers may be integrated into the semifinished product. If the semifinished product is single layer manufactured on a blow molding plant, barrier layers may be applied subsequently, for example by fluorination or painting. These coatings are preferably applied after the half shells have been welded together. However, the coating procedures may also take place prior to the welding process, where appropriate prior to or after the attachment of incorporated parts to the half shells.

According to DE 100 42 121, the cutting of the plastic parison may take place prior to or after separation from the die of the extrusion head. It is also foreseen that the cutting of the plastic parison may actually take place during the extrusion process.

The abovementioned process separates the usually approximately cylindrical parison (tube) at one or more locations longitudinally, using the pressure or push effect of the upstream melt to move the parison over a cutting device, such as one or more knives. Another factor promoting this procedure in cases where the arrangement of the extrusion device is vertical is the gravitational force exerted by the discharged melt.

Serious disadvantages have been found to be associated with the use of the cutting devices conventionally used for separating webs of plastic, for example conventional steel blades. In particular, it has been found that adhesion of the molten plastic to the device or blade often occurs. This adhesion causes undesirable deformation of the parison and of the molten semifinished sheets obtained after the separation procedure. It has also been found that in many instances, in particular at the start of the extrusion procedure, the pressure exerted by the upstream melt is not sufficient for the desired cutting procedure to be carried out consistently. The resistance exerted by the cutting device or the knife on the parison is frequently so great that severe distortion of the parison occurs, in particular at the start of the extrusion process, i.e. at the start of tube discharge from the die. The resultant cut edges, and the semifinished products themselves, are often considerably deformed as a result (FIG. 3).

The problems described above are particularly relevant to parisons with especially high wall thickness. These problems can also be caused by some polymer materials when they are used in parisons. If a parison with relatively high wall thickness is passed over a conventional cutting device, marked distortion and creasing occurs, in particular at the resultant cut edges.

It is an object of the present invention, therefore, to provide an apparatus which partitions plastic parisons, which does not have the abovementioned disadvantages of the prior art, and which can process parisons with thin-and-thick layer walls, made from high-to (inclusive) low-molecular-weight and/or high-to (inclusive) low-density materials. The device of the invention can therefore process a wider spectrum of polymers, and the nature of the extrusion products may be varied more widely. Further objects are apparent from the description of the invention hereinafter.

We have found that this object is achieved by the features of claim 1.

Advantageous embodiments of the device of the invention are defined in the subclaims.

The invention provides a device for partitioning a plastic parison to give at least one semifinished open-surface product, where the device encompasses at least one means of partitioning the plastic parison and encompasses at least one means of drive or one draw-off mechanism.

It has been found that the abovementioned problems can be overcome by equipping a device for partitioning a plastic parison with a drive system which draws off or transports the parison and/or the resultant molten semifinished sheet products. The effect of the draw-off mechanism is that the parison and, respectively, the semifinished products are pulled over the means of partitioning the plastic parison, this means being termed hereinafter a cutting device, thus compensating the resistance described above exerted by the cutting device on the parison, or the forces arising.

Figure 4:
FIG. 4 illustrates a device for partitioning parisons, and the resultant partitioned parisons or semifinished sheets.

The parisons partitioned by the device of the invention, or the resultant semifinished sheets, have no, or comparatively low levels of, creasing or irregularity, in particular at the margins, i.e. at the cut edges (FIG. 4).

One particularly preferred drive system encompasses roller-type driven units, such as pneumatic floating rollers. However, driven devices of the invention also include driven belts, for example, or other suitable driven units. The driven units exert tension on the parison and, respectively, the semifinished products. This tension acts together with the compression brought about by the extrusion process to guide the parison in the desired manner consistently over the cutting device.

It is also preferable that the driven units are smooth, profiled, or grooved, or have a suitable coating, in order to ensure sufficient friction and, respectively, continuous transport of the thermoplastic composition.

According to the invention, it is particularly preferable to use two pneumatically driven rolls as a means of drive. The use of driven rollers or driven rolls, preferably installed in the direct vicinity of the cutting device, has the additional advantage that the parison section is distanced immediately from the cutting device after separation of the parison, thus avoiding adhesion of the semifinished sheets to the device.

In one particularly preferred embodiment, the driven rolls are integrated within the cutting device. An example of a method for achieving this sets the means of drive, preferably the driven roll(s), into recesses on the means of partitioning the plastic parison.

According to the invention, the driven rolls may also be installed separately, i.e. outside the cutting device.

The device for partitioning the annular tube to give one or more molten semifinished sheets may in principle encompass almost any desired cutting devices and, respectively, knife designs and knife geometries. For example, the cutting device may encompass sharp-edged cutting units which may also, where appropriate, be exchangeable. Besides sharp-edged devices, use may also be made of edgeless, rectangular, or bar-shaped devices functioning as a knife or separator. However, a means of partitioning the plastic parison which encompasses a body of triangular cross section which has been arranged transversely to the direction of extrusion has proven particularly advantageous.

It has proven advantageous for the cutting device used, which preferably encompasses a body made from metal or plastic, preferably with triangular cross section, to be provided with a coating which inhibits adhesion of the hot molten plastic. Suitable coatings encompass polytetrafluoroethylene, for example.

The nature of the surface of the cutting device may be smooth or else grooved.

In another preferred embodiment of the present invention, the device of the invention encompasses a holder for the means of partitioning the plastic parison and/or for the means of drive. The design of this holder is preferably such that it functions as a spacer for the semifinished open-surface products, so ensuring that undesirable contact between the semifinished products after the separation procedure is avoided, and free space is created for components and devices to be introduced.

In another particularly preferred embodiment, the device of the invention is equipped with means of guiding the semifinished open-surface products. The means of guiding particularly preferably encompasses at least two guide rollers, which may, where appropriate, be driven, and can preferably be moved transversely to the direction of extrusion. The moveability of the guide rollers transversely to the direction of extrusion permits controlled setting of the distance between the semifinished products obtained.

The abovementioned means of guiding or guide rollers may be used not only to control the distance between the semifinished products obtained but also to preform, and in particular flatten, the semifinished products. The device of the invention illustrated in FIG. 2 has guide rollers as well as the abovementioned driven rollers.

Another embodiment of the invention provides, if required, for the holder, the means of partitioning the plastic parison, the means of guiding, and/or the means of drive to be fully or else partially heatable, or coolable, or capable of being heated or cooled as desired. If advantageous, it is also possible for certain regions to be heated while at the same time other regions are cooled.

The relative velocity of parison and, respectively, parison section to the means of drive here may vary.

The invention further provides the use of the device of the invention for partitioning an extruded or coextruded plastic parison to give at least one semifinished open-surface product.

Figure 1:
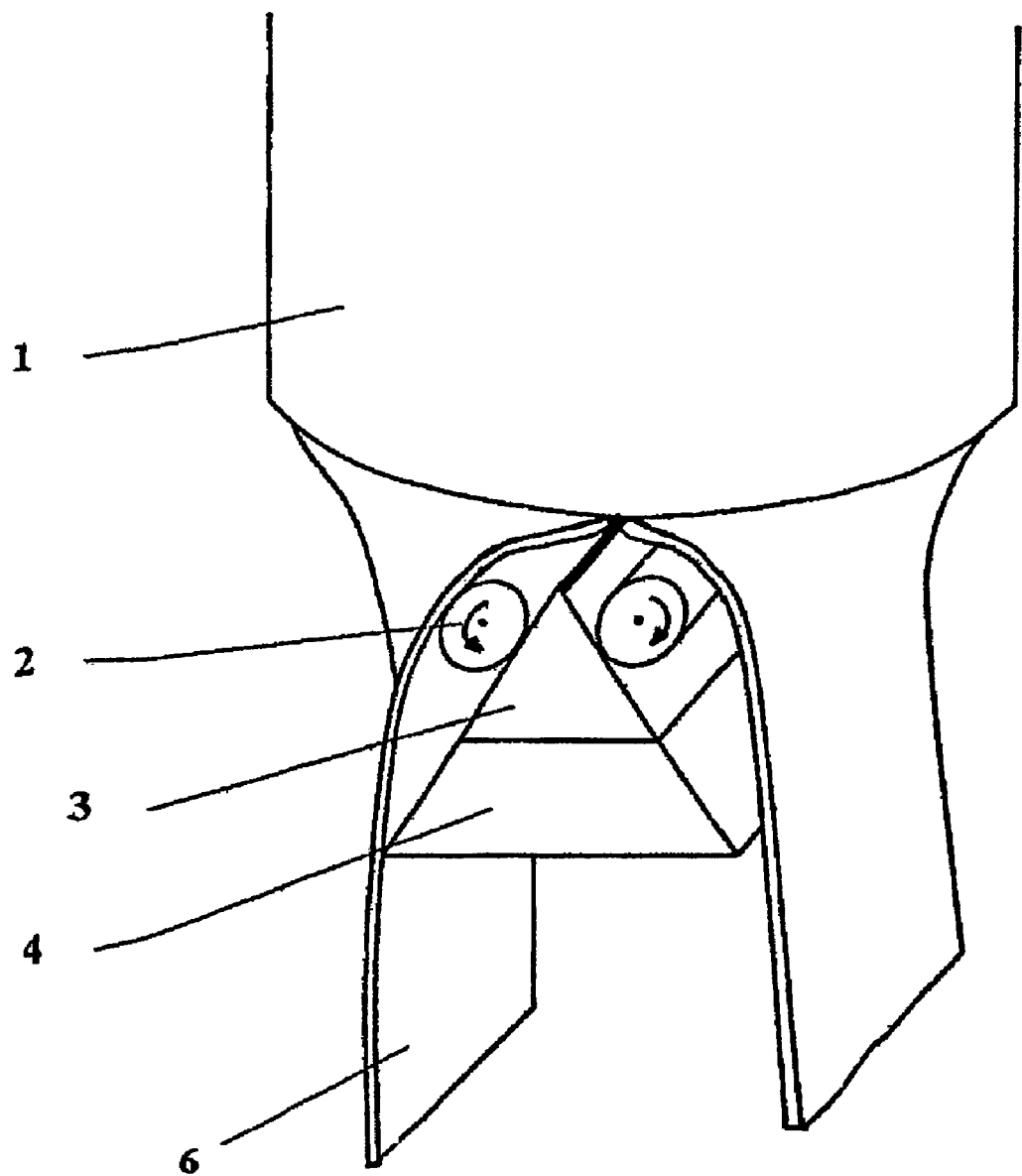
FIG. 1 is a diagram of a device for partitioning a plastic parison.

FIG. 1 is a diagram of a device of the invention for partitioning a plastic parison. The plastic parison is discharged as a tube from the die of the extrusion device (1). A body (3), optionally coolable, with a triangular cross section, arranged transversely to the direction of extrusion, functions as a cutting device or means of partitioning the plastic parison. The device also encompasses a heatable holder (4) on which the cutting device has been installed. Two pneumatically driven rolls (2) arranged in the immediate vicinity of the cutting device function as a means of drive of the invention. Installation in the immediate vicinity of the body (3) has the advantage that the two resultant parison sections (6) are distanced from the cutting device immediately after separation of the parison, and adhesion of the semifinished sheets to the device is therefore avoided. The tension exerted by the driven rolls (2) guides the plastic parison consistently over the cutting device, and the resultant semifinished sheets therefore have no, or comparatively very little, creasing or irregularity at the margins, i.e. at the cut edges.

Figure 2:
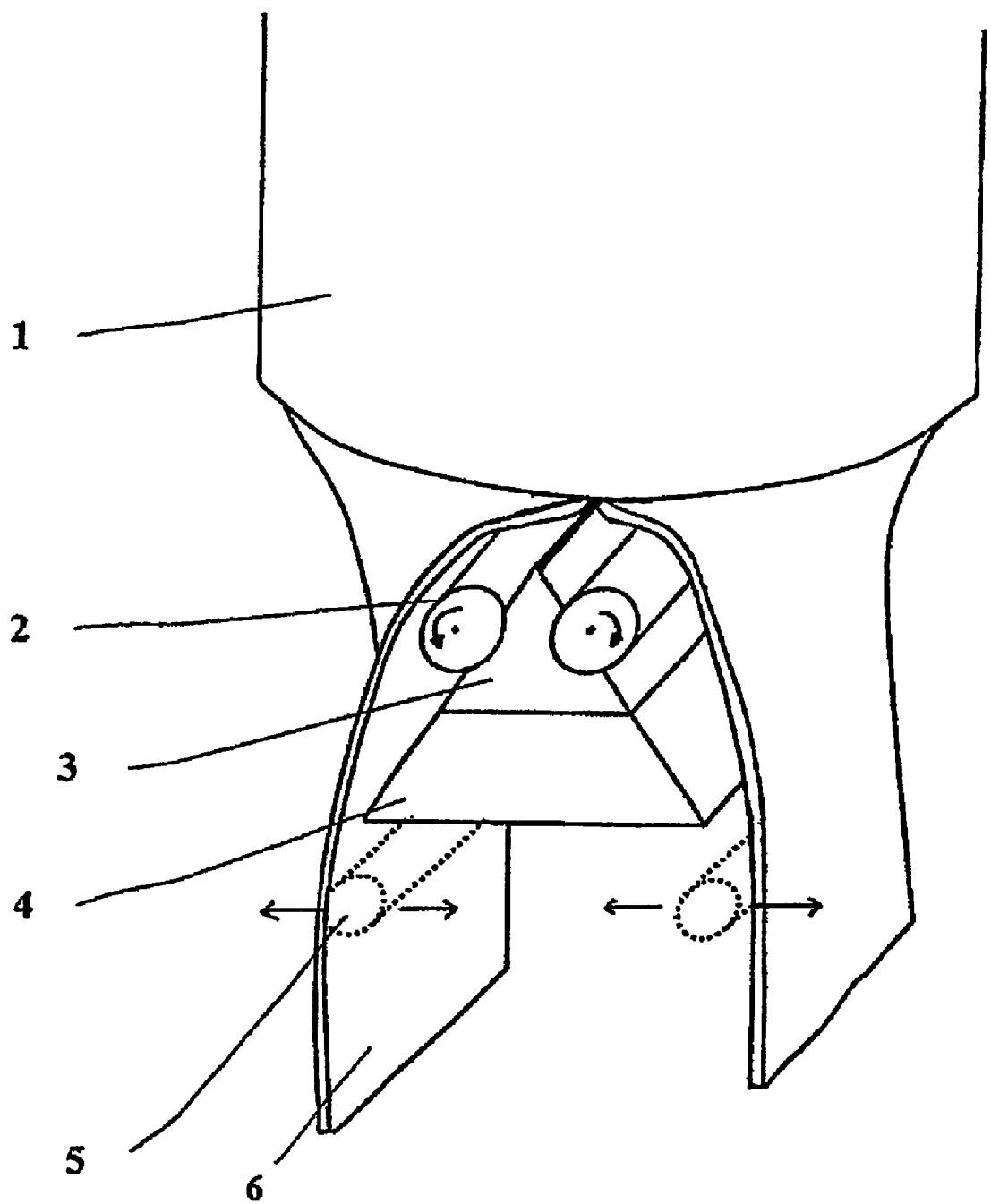
FIG. 2 is a diagram of a device for partitioning a plastic parison with guide rollers.

FIG. 2 is a diagram of another device of the invention for partitioning a plastic parison. The device shown in FIG. 2 differs from the device of FIG. 1 merely in the presence of two guide rollers (5) additionally installed. These guide rollers eliminate undesirable contact between the semifinished products (6) after the separation procedure and also provide the desired free space for components and devices to be introduced. The guide rollers (5) can be moved transversely to the direction of extrusion. The moveability of the guide rollers transversely to the direction of extrusion permits controlled setting of the distance between the semifinished products obtained. The driven rolls (2) in the device of FIG. 2 have been set into or integrated into the cutting device (3).

Figure 3:
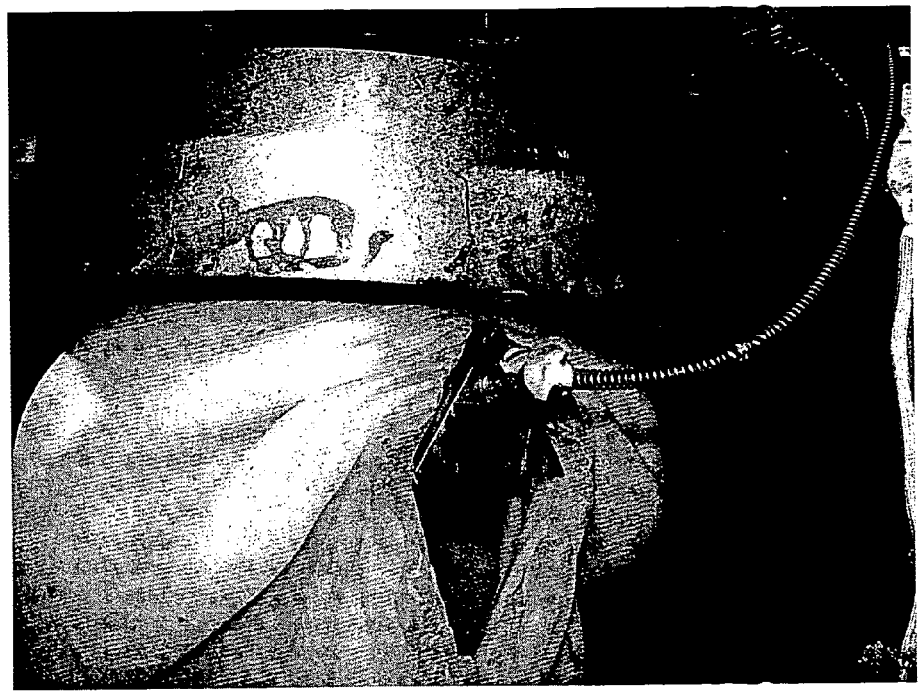
FIG. 3 illustrates deformation in parisons prepared by processes not according to the invention.

FIG. 3 depicts the distortion of the parison when devices not according to the invention are used (without a means of drive). The outcome is considerable deformation of the resultant cut edges, and also of the semifinished products themselves.

FIG. 4 depicts the device of the invention and the resultant partitioned parisons or resultant semifinished sheets. These have no creasing or irregularity, in particular at the margins, i.e. at the cut edges. The polymer processed was the same as that in FIG. 3.

The invention claimed is:

1. A device for partitioning an extruded or coextruded plastic parison to give at least one semifinished open-surface product comprising at least one means of partitioning the plastic parison and at least one draw-off means for pulling the plastic parison over the means of partitioning thereby compensating for a resistance of the means of partitioning, wherein the draw-off means is heatable or coolable and the means of partitioning the plastic parison is a body of triangular cross section which has been arranged transversely to a direction of extrusions,
    wherein the draw-off means has been set into recesses on the means of partitioning the plastic parison.

2. The device as claimed in claim 1, wherein the draw-off means is (i) a smooth, profiled, and grooved surface, (ii) a coated surface, or (iii) a smooth, profiled, grooved and coated surface.

3. The device as claimed in claim 1, wherein the draw-off means comprises at least one driven roll.

4. The device as claimed in claim 1, wherein the device further comprises a holder for at least one of the means of partitioning the plastic parison and the draw-off means.

5. The device as claimed in claim 4, wherein the holder is a spacer for the semifinished open-surface products.

6. The device as claimed in claim 1, wherein the device further comprises a means of guiding the semifinished open-surface products for controlling the distance between the semifinished products.

7. The device as claimed in claim 6, wherein the means of guiding comprises guide rollers.

8. A process comprising partitioning an extruded or coextruded plastic parison to give at least one semifinished open-surface product, with a device comprising at least one means of partitioning the plastic parison and at least one draw-off means for pulling the plastic parison over the means of partitioning thereby compensating for a resistance of the means of partitioning, wherein the draw-off means is heatable or coolable and the means of partitioning the plastic parison is a body of triangular cross section which has been arranged transversely to a direction of extrusion, wherein the draw-off means has been set into recesses on the means of partitioning the plastic parison.

9. The device as claimed in claim 3, wherein the draw-off means comprises at least two driven rolls.

10. The device as claimed in claim 1, wherein the body is metallic.

11. The device as claimed in claim 10, wherein the body is metallic and has a coating of plastic.

12. The device as claimed in claim 7, wherein the guide rollers are driven.

13. The device as claimed in claim 12 wherein the guide rollers can be moved transversely to a direction of extrusion.

14. The process as claimed in claim 8, where the device further comprises a holder for at least one of the means of partitioning the plastic parison and the draw-off means.

15. The process as claimed in claim 14, further comprising heating or cooling the holder.

16. The device as claimed in claim 7 wherein the guide rollers are heatable or coolable.

17. The process as claimed in claim 8 wherein the device further comprises a means of guiding the semifinished open-surface products for controlling the distance between the semifinished products.

18. The process as claimed in claim 17 wherein the means of guiding comprises guide rollers.

19. The process as claimed in claim 18 wherein the guide rollers are heatable or coolable.

20. The process as claimed in claim 18 wherein the guide rollers are driven.

21. The device as claimed in claim 4 wherein the holder is heatable or coolable.

22. The device as claimed in claim 1 wherein the means of partitioning is heatable or coolable.

23. The process as claimed in claim 8 wherein the means of partitioning is heatable or coolable.

* * * * *